May 27, 1924.
L. MATIJAS
COTTON CULTIVATOR
Filed Feb. 16, 1922
1,495,341
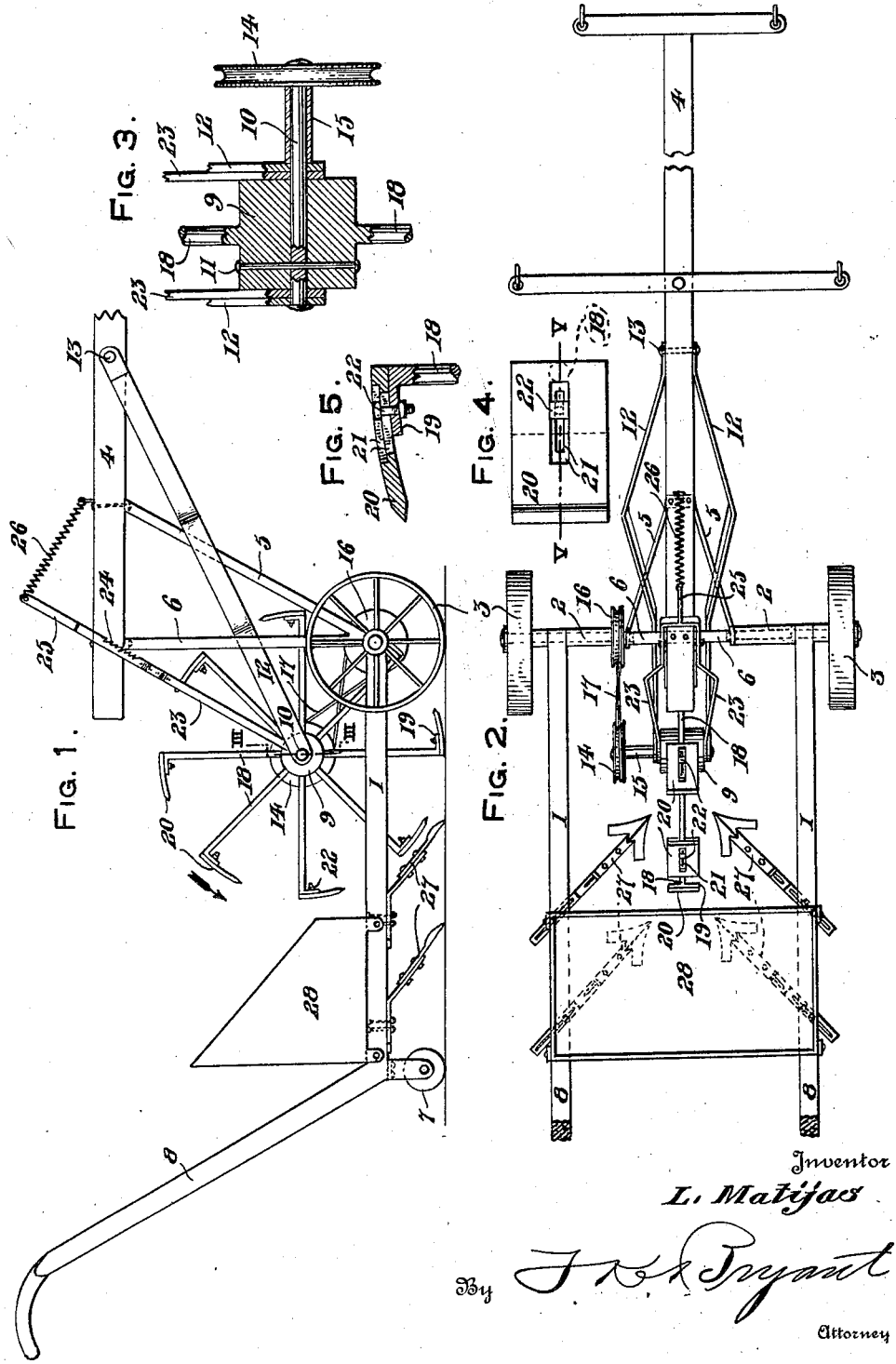
Inventor
L. Matijas
By J. K. Bryant
Attorney Patented May 27, 1924.

1,495,341

UNITED STATES PATENT OFFICE.

LOUIS MATIJAS, OF SHINER, TEXAS.

COTTON CULTIVATOR.

Application filed February 16, 1922. Serial No. 536,982.

*To all whom it may concern:*

Be it known that I, LOUIS MATIJAS, a citizen of Czechoslovakia, residing at Shiner, in the county of Lavaca and State of Texas, have invented certain new and useful Improvements in Cotton Cultivators, of which the following is a specification.

This invention relates to certain new and useful improvements in cotton cultivators and has particular reference to a cotton chopping machine wherein a rotatable chopping or cutting element is driven by the ground wheels of the machine with the machine frame supporting digging plows, and with a receptacle carried by the rear end of the frame for receiving the cut plants.

A further object of the invention embodies in a cotton chopping machine a rotatable chopping or cutting element supported on a swingingly mounted frame with devices for varying the distance between the cutting element and the ground line.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a fragmentary side elevational view, partly broken away of a cotton cultivator constructed in accordance with the present invention, showing the adjustable means for vertically shifting the cutting element, Figure 2 is a fragmentary top plan view showing the driving connection between the frame axle and cutting element, Figure 3 is a detail sectional view taken on line III—III of Fig. 1 showing the hub of the cutting and driving pulley therefor, Figure 4 is a top plan view of one of the feet or blades of the cutting element, and Figure 5 is a detail sectional view taken on line V—V of Fig. 4 showing the adjustable mounting of the blade.

Referring more in detail to the accompanying drawing there is illustrated a cotton cultivator or chopper embodying a frame comprised of side bars 1 carrying an axle 2 adjacent the forward ends thereof for supporting ground wheels 3, a draft bar 4 being secured to the frame bars 1 and axle 2 by the brace bars 5 and 6, the latter brace bar being formed of an inverted U-shaped iron as shown in Figs. 1 and 2. The rear end of the frame bars 1 are mounted on ground wheels 7 while handle bars 8 extend from the rear ends of said bars.

A cotton chopping wheel is rotatably supported intermediate the side bars 1 and between the front and rear ground wheel 3 and 7, the wheel including a hub 9 secured to the stub shaft 10 by the anchoring pin 11 with the shaft 10 journaled in the rear lower ends of the lever bars 12 that are pivotally supported at their upper ends as at 13 to the draft beam 4. A pulley 14 is secured to a projecting end of the stub shaft 10 and is spaced from the hub 9 by the collar 15, a pulley 16 secured to the axle 2 intermediate the frame bars 1 having a blade connection 17 with the pulley 14 as clearly shown in Figs. 1 and 2. Radial spokes or arms 18 are carried by the hub 9 and have angularly directed arcuate feet 19 formed at the outer ends thereof, and upon which feet the cutting blades 20 are adjustably mounted, each cutter blade having a longitudinal shouldered slot 21 formed therein for the reception of the headed screw bolt 22 that projects through an opening in the angle foot 19 of the arm 18 and is suitably secured therein by a lock nut, the cutting blade 20 being longitudinally adjustable over the angle foot 19 with all of the cutting blades extending in the same direction.

To vary the distance between the cutting member and the ground line and to constitute a support therefor, a strap iron 23 having the lower ends thereof journaled on the stub shaft 10 at opposite sides of the hub 9, is provided with rack teeth 24 upon the rear edges thereof that engage the upper end of the inverted U-shaped beam support 6 as shown in Figs. 1 and 2, the strap iron 23 enclosing the beam 4 and having an arm extension 25 while a coil spring 26 extends between the outer end of the arm extension 25 and the beam 4 to effect engagement of the rack teeth 24 of the strap iron with the U-shaped frame 6.

Digging plows 27 are adjustably supported on the frame bars 1 and are arranged in pairs at opposite sides of the cutting element, while a receptacle 28 is supported on the frame bars rearwardly of the cutting element.

The cutting element is rotated by the belt connection between the pulleys 14 and 16 on the stub shaft 10 and the axle 2 respectively, all blades 20 effectively cutting the cotton or other plants and delivering the same as indicated by the arrow into the receptacle 28. The digging plows 27 are provided for unearthing the roots of the plants, the device being especially employed for thinning or cultivating a cotton field. The adjustability of the strap iron 23 provides for the shifting of the cutting element while the adjustable mounting of the cutting blades 20 will permit a greater length of movement of the blades in proximity of the ground line.

While there is herein shown and described the preferred embodiment of the present invention it is nevertheless to be understood that minor changes may be made therein without departing from the spirit and scope thereof as claimed.

What is claimed as new is:—

1. A cotton chopper of the type described comprising a frame, ground wheels therefor, a rotatable cutting element pivotally supported on the frame, connections between the cutting element and ground wheels for rotating the same, and a tensioned strap iron associated with the cutting element and frame for vertically shifting the cutting element.

2. A cotton chopper of the type described comprising side bars, ground wheels therefor, a draft bar, brace bars secured to said side bars and draft bar for supporting the latter, a rotatable cutting element pivotally secured to the draft bar, and a tensioned strap iron associated with the cutting element and draft bar for vertically shifting the cutting element.

3. A cotton chopper of the type described comprising side bars, ground wheels therefor, a draft bar, brace bars secured to said side bars and draft bar for supporting the latter, a rotatable cutting element pivotally secured to the draft bar, a tensioned strap iron associated with the cutting element and draft bar for vertically shifting the cutting element, and a connection between the cutting element and ground wheel for driving said element.

4. A cotton chopper of the type described comprising side bars, ground wheels therefor, a draft bar, brace bars rigidly connecting said draft bar to the side bars, a rotatable cutting element, lever bars pivotally connecting said cutting elements to the draft bar, a strap iron pivotally associated with said cutting element and adapted to adjustably engage one of the said brace bars, associated with said draft bar, for vertically adjusting the cutting elements, and a resilient connection between said strap iron and draft bar for retaining said iron in adjusted engagement with said brace bars.

In testimony whereof I affix my signature.

LOUIS $\overset{\text{his}}{\times}$ MATIJAS.
mark

Witnesses:
C. H. STRATMAN,
JOHN J. VALES, Jr.